(12) United States Patent
Kang et al.

(10) Patent No.: US 10,118,613 B2
(45) Date of Patent: Nov. 6, 2018

(54) VEHICLE AND CONTROLLING METHOD THEREOF

(71) Applicant: HYUNDAI MOTOR COMPANY, Seoul (KR)

(72) Inventors: Kyunghyun Kang, Suwon-si (KR); Ki Dong Kang, Seoul (KR); HeeJin Ro, Seoul (KR); Seok-young Youn, Seoul (KR); Sung Un Kim, Yongin-si (KR); Bitna Baek, Seoul (KR); Ga Hee Kim, Suwon-si (KR); Jong Hyuck Heo, Yongin-si (KR); Chisung Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 249 days.

(21) Appl. No.: 14/958,920

(22) Filed: Dec. 3, 2015

(65) Prior Publication Data
US 2016/0272201 A1 Sep. 22, 2016

(30) Foreign Application Priority Data

Mar. 19, 2015 (KR) .......................... 10-2015-0038355

(51) Int. Cl.
*B60W 30/095* (2012.01)
*G08G 1/16* (2006.01)
(Continued)

(52) U.S. Cl.
CPC ........... *B60W 30/0956* (2013.01); *G05D 1/00* (2013.01); *G08G 1/0112* (2013.01);
(Continued)

(58) Field of Classification Search
CPC ............... G05D 1/10; G08G 1/096716; G08G 1/096725; G08G 1/096741; G08G 1/096775; G08G 1/166; G08G 1/167; G08G 1/0112; B60W 30/0956; B60W 2420/52; B60W 2420/42; B60W 2550/40; B60W 2550/30
See application file for complete search history.

(56) References Cited

U.S. PATENT DOCUMENTS 5,983,161 A * 11/1999 Lemelson ............... G01S 19/11
340/436
8,634,980 B1 * 1/2014 Urmson ............... G05D 1/0214
701/23
(Continued)

FOREIGN PATENT DOCUMENTS

JP 2005-202512 A 7/2005
JP 2008-307951 A 12/2008
(Continued)

*Primary Examiner* — Mussa A Shaawat
(74) *Attorney, Agent, or Firm* — McDermott Will & Emery LLP

(57) ABSTRACT

A vehicle operating in accordance with a predetermined advanced driver assistance system (ADAS) control logic includes a sensing unit configured to acquire environment information of a given area, and a controller configured to change a setting value of the ADAS control logic based on the acquired environment information in real time and control the vehicle in accordance with the ADAS control logic using the changed setting value.

18 Claims, 10 Drawing Sheets

(51) Int. Cl.
*G05D 1/00* (2006.01)
*G08G 1/01* (2006.01)
*G08G 1/0967* (2006.01)

(52) U.S. Cl.
CPC ......... *G08G 1/0129* (2013.01); *G08G 1/0141* (2013.01); *G08G 1/096716* (2013.01); *G08G 1/096725* (2013.01); *G08G 1/096741* (2013.01); *G08G 1/096775* (2013.01); *G08G 1/166* (2013.01); *G08G 1/167* (2013.01); *B60W 2420/42* (2013.01); *B60W 2420/52* (2013.01); *B60W 2550/30* (2013.01); *B60W 2550/40* (2013.01)

(56) References Cited

U.S. PATENT DOCUMENTS

| 9,308,914 | B1* | 4/2016 | Sun | B60K 28/06 |
| 9,487,212 | B1* | 11/2016 | Adam | B60W 30/143 |
| 9,669,830 | B2* | 6/2017 | Weisswange | B60W 30/14 |
| 2002/0005778 | A1* | 1/2002 | Breed | B60Q 9/008 340/435 |
| 2006/0287826 | A1* | 12/2006 | Shimizu | B60K 35/00 701/431 |
| 2010/0141476 | A1* | 6/2010 | Bauer | G06K 9/00818 340/905 |
| 2012/0147187 | A1* | 6/2012 | Li | G06K 9/3233 348/148 |
| 2012/0290150 | A1* | 11/2012 | Doughty | G08G 1/0116 701/2 |
| 2014/0074388 | A1* | 3/2014 | Bretzigheimer | B60T 1/10 701/117 |
| 2014/0135598 | A1* | 5/2014 | Weidl | A61B 5/0205 600/301 |
| 2014/0149013 | A1* | 5/2014 | Matsuno | G08G 1/166 701/70 |
| 2015/0130600 | A1* | 5/2015 | Huang | G08G 1/166 340/438 |
| 2015/0344031 | A1* | 12/2015 | Weisswange | B60W 30/14 701/1 |
| 2016/0116293 | A1* | 4/2016 | Grover | G01C 21/34 701/23 |
| 2016/0137177 | A1* | 5/2016 | Wilhelm | B60T 7/22 701/70 |
| 2016/0142736 | A1* | 5/2016 | Zhou | H04N 19/61 375/240.18 |
| 2016/0180192 | A1* | 6/2016 | Ayvaci | G06K 9/00805 382/104 |
| 2016/0229397 | A1* | 8/2016 | Muthukumar | B60R 21/013 |

FOREIGN PATENT DOCUMENTS

| JP | 2009-282702 A | 12/2009 |
| KR | 10-1384710 B1 | 4/2014 |

* cited by examiner

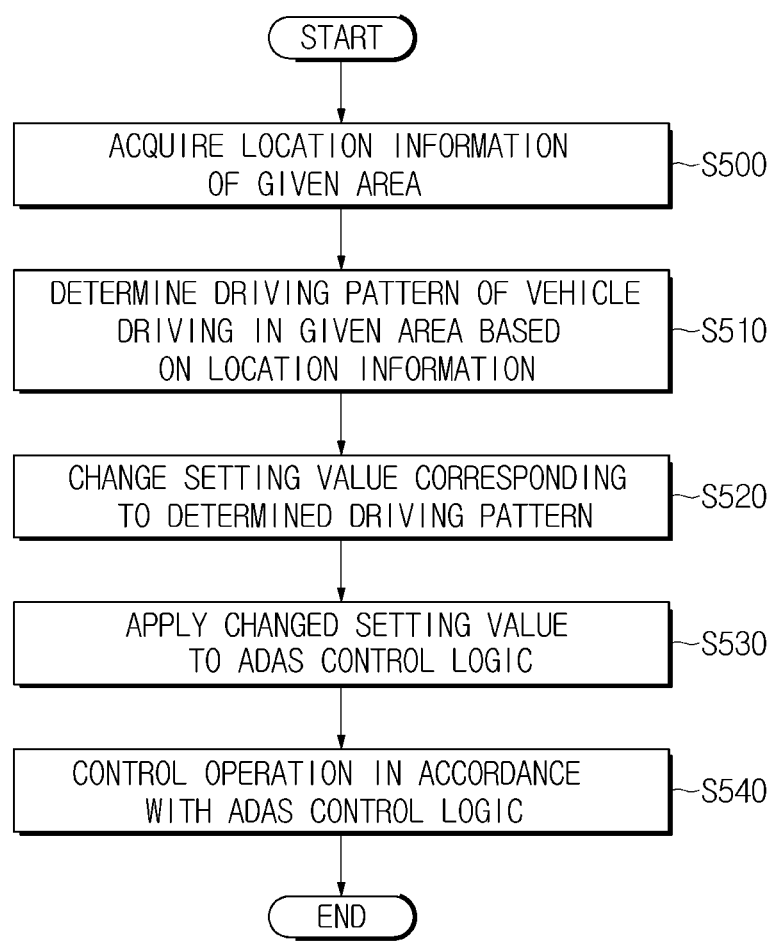

VEHICLE AND CONTROLLING METHOD THEREOF

CROSS-REFERENCE TO RELATED APPLICATION(S)

This application claims the benefit of Korean Patent Application No. 10-2015-0038355, filed on Mar. 19, 2015 in the Korean Intellectual Property Office, the disclosure of which is incorporated herein by reference.

TECHNICAL FIELD

Embodiments of the present disclosure relate to a vehicle operating in accordance with an advanced driver assistance system (ADAS) control logic and a method of controlling the same.

BACKGROUND In general, a vehicle is a transportation apparatus driving on a road by using fossil fuels, electricity, and the like, as a power source.

With the trend of automotive electronic systems, vehicles provided with an active safety system (ASS) to prevent accidents immediately before or in the moment of the accidents have been introduced.

Recently, research on vehicles provided with an advanced driver assistance system (ADAS) that actively provides information regarding a state of a vehicle, driver's condition, and surrounding environment to relieve driver's workload and enhance driving convenience has been vigorously performed.

SUMMARY

Therefore, it is an aspect of the present disclosure to provide a vehicle that changes a setting value of an advanced driver assistance system (ADAS) control logic in real time based on environment information around the vehicle and a method of controlling the same.

Additional aspects of the disclosure will be set forth in part in the description which follows and, in part, will be obvious from the description, or may be learned by practice of the disclosure.

In accordance with one aspect of the present disclosure, a vehicle operating in accordance with a predetermined advanced driver assistance system (ADAS) control logic includes a sensing unit configured to acquire environment information of a given area, and a controller configured to change a setting value of the ADAS control logic based on the acquired environment information in real time and control the vehicle in accordance with the ADAS control logic based on the changed setting value.

The controller may change, based on the environment information, a first setting value preset by a user or a second setting value preset during a manufacturing process of the vehicle.

The controller may change the first setting value based on the environment information when the environment information satisfies predetermined conditions.

The vehicle may further include a communication unit, and the controller may transmit the environment information to a server via the communication unit when the environment information satisfies predetermined conditions, and receive the ADAS control logic, to which the second setting value changed based on the environment information is applied, from the server via the communication unit.

The sensing unit may acquire the environment information including at least one selected from the group consisting of driving-related information of an adjacent vehicle located in the given area and location information of the given area.

When the sensing unit acquires the driving-related information of the adjacent vehicle, the controller may determine a driving pattern of the adjacent vehicle based on the driving-related information and change the setting value corresponding to the determined driving pattern.

When the sensing unit acquires the location information, the controller may determine a driving pattern of the vehicle driving in the given area based on the location information and change the setting value corresponding to the determined driving pattern.

The controller may control the vehicle in accordance with the ADAS control logic including at least one selected from the group consisting of Blind Spot Detection (BSD), Forward Collision Warning System (FWC), Advanced Emergency Braking System (AEBS), Advanced Smart Cruise Control (ASCC), Lane Departure Warning System (LDWS), Lane Keeping Assist System (LKAS), and Rear-end Collision Warning System (RCW).

The controller may determine whether a vehicle ahead has a sudden braking pattern based on environment information acquired by the sensing unit and change a setting value corresponding to a distance from the vehicle ahead in an ASCC control logic based on the determined result.

The controller may identify a road on which the vehicle drives based on environment information acquired by the sensing unit and changes a setting value corresponding to a warning time of a BSD control logic based on the identified result.

In accordance with another aspect of the present disclosure, a method of controlling a vehicle includes acquiring environment information of a given area, changing a setting value of an advanced driver assistance system (ADAS) control logic of a vehicle based on the acquired environment information in real time, and operating in accordance with the ADAS control logic based on the changed setting value.

The changing of the setting value of the ADAS control logic may include changing a first setting value set by an input of a driver or passenger or a second setting value preset during a manufacturing process based on the environment information.

The changing of the setting value of the ADAS control logic may include changing the first setting value based on the environment information when the environment information satisfies predetermined conditions.

The changing of the setting value of the ADAS control logic may include transmitting the environment information to a server when the environment information satisfies predetermined conditions, and receiving the ADAS control logic, to which the second setting value changed based on the environment information is applied, from the server.

The acquiring of the environment information may include acquiring the environment information including at least one selected from the group consisting of driving-related information of an adjacent vehicle located in the given area and location information of the given area.

The changing of the setting value of the ADAS control logic may include determining a driving pattern of the adjacent vehicle based on the driving-related information when the driving-related information of the adjacent vehicle is acquired, and changing the setting value corresponding to the determined driving pattern.

The changing of the setting value of the ADAS control logic may include determining a driving pattern of the vehicle driving in the given area based on the location information when the location information is acquired, and changing the setting value corresponding to the determined driving pattern.

The operating in accordance with the ADAS control logic may be performed by operating in accordance with the ADAS control logic including at least one selected from the group consisting of Blind Spot Detection (BSD), Forward Collision Warning System (FWC), Advanced Emergency Braking System (AEBS), Advanced Smart Cruise Control (ASCC), Lane Departure Warning System (LDWS), Lane Keeping Assist System (LKAS), and Rear-end Collision Warning System (RCW).

The changing of the setting value of the ADAS control logic may include determining whether a vehicle ahead has a sudden braking driving pattern based on the acquired environment information, and changing a setting value corresponding to a distance from the vehicle ahead in an ASCC control logic based on the determined result.

The changing of the setting value of the ADAS control logic may include identifying a road on which the vehicle drives based on the acquired environment information, and changing a setting value corresponding to a warning time of a BSD control logic based on the identified result.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 9 is a flowchart illustrating a method of controlling a vehicle according to another embodiment.

DETAILED DESCRIPTION

Figure 1:
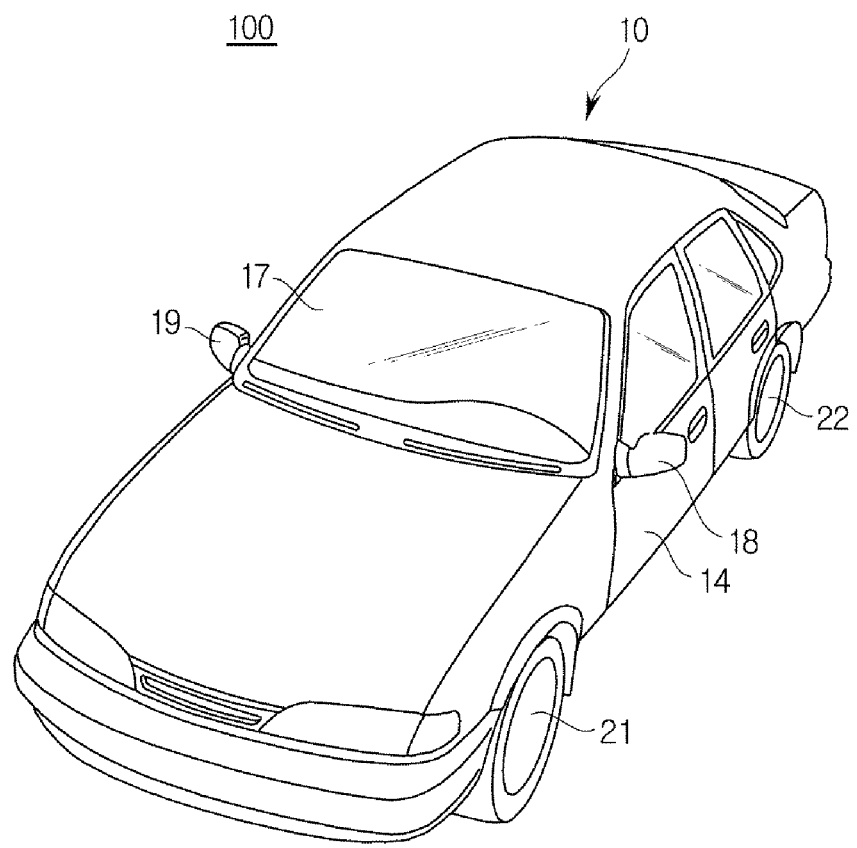
FIG. 1 is an exterior view of a vehicle according to an embodiment of the present disclosure.

Reference will now be made in detail to the embodiments of the present disclosure, examples of which are illustrated in the accompanying drawings, wherein like reference numerals refer to like elements throughout.

Hereinafter, a vehicle and a method of controlling the same will be described with reference to the accompanying drawings.

FIG. 1 is an exterior view of a vehicle according to an embodiment of the present disclosure.

Referring to FIG. 1, a vehicle 100 according to an embodiment includes a body 10 defining an appearance of the vehicle 100, wheels 21 and 22 configured to move the vehicle 100, doors 14 configured to shield the inside of the vehicle 100 from the outside, a front glass 17 configured to provide a driver sitting in the vehicle 100 with a forward view of the vehicle 100, and side mirrors 18 and 19 configured to provide the driver with rear views of the vehicle 100.

The wheels 21 and 22 include front wheels 21 disposed at front portions of the vehicle 100 and rear wheels 22 disposed at rear portions of the vehicle 100. The front wheels 21 or rear wheels 22 may receive a rotational force from a drive unit 400, which will be described later, and move the body 10 forward or backward.

The doors 14 are pivotally coupled to the body 10 at left and right sides. The driver may get into the vehicle 100 by opening the door 14, and the inside of the vehicle 100 may be shielded from the outside by closing the door 14.

The front glass 17, also called a windshield glass, is disposed at a front upper portion of the body 10 to allow the driver sitting in the vehicle 100 to acquire visual information about a forward view of the vehicle 100.

Also, the side mirrors 18 and 19 include a left side mirror 18 disposed at the left side of the body 10 and a right side mirror 19 disposed at the right side of the body 10 and allow the driver sitting in the vehicle 100 to acquire visual information about side views and rear views of the vehicle 100.

Figure 2:
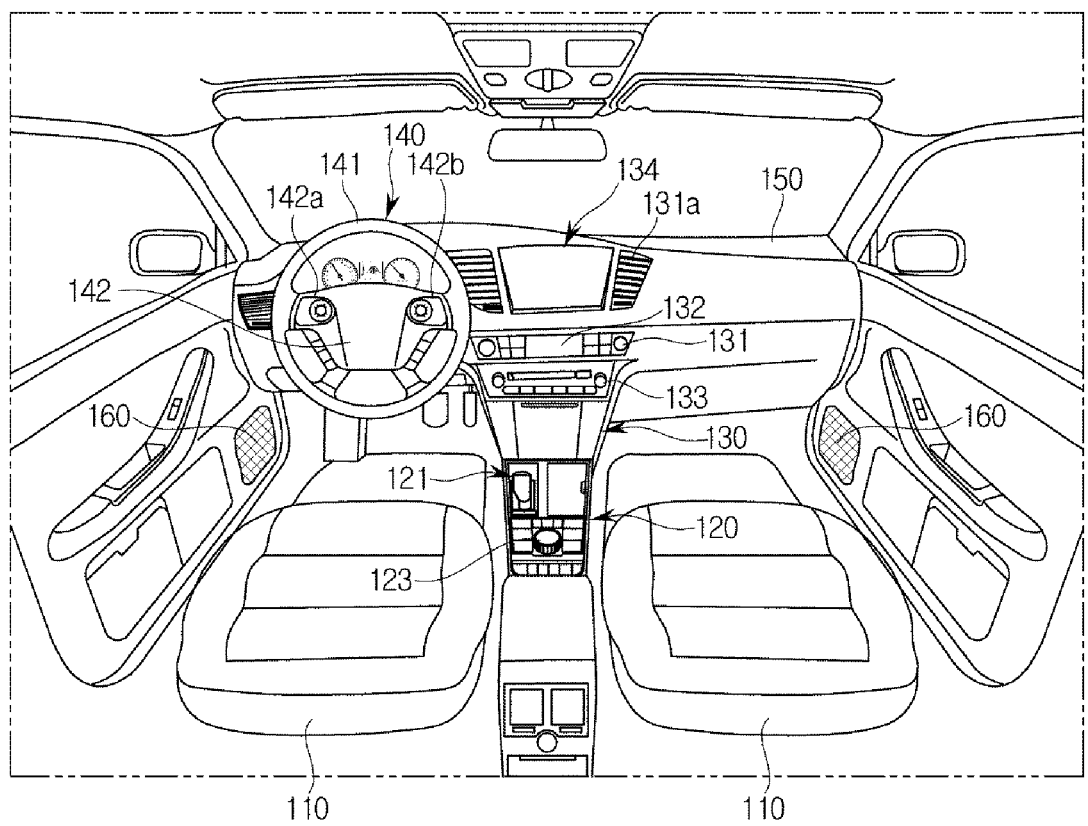
FIG. 2 is an interior view of a vehicle according to an embodiment of the present disclosure.

FIG. 2 is an interior view of a vehicle according to an embodiment of the present disclosure.

Referring to FIG. 2, the vehicle 100 may include seats 110 on which a driver and passengers sit, a gear box 120, a dashboard 150 provided with a center fascia 130 and a steering wheel 140, and a speaker 160.

The gear box 120 may be provided with a transmission lever 121 to change gears of the vehicle 100 and a dial control unit 123 to control performance of functions of the vehicle 100.

The steering wheel 140, which is mounted on the dashboard 150 to control a driving direction of the vehicle 100, includes a rim 141 gripped by the driver and a spoke 142 connected to a steering device 300 of the vehicle 100 and connecting the rim 141 with a hub of a rotating shaft for steering. According to an embodiment, the spoke 142 may include manipulators 142a and 142b to control various devices of the vehicle 100, for example, an audio device.

The center fascia 130 mounted on the dashboard 150 may be provided with an air conditioner 131, a clock 132, and an audio device 133, a display 134, and the like.

The air conditioner 131 maintains the inside of the vehicle 100 in a clean state by controlling temperature, humidity, cleanness of air, and air flow inside the vehicle 100. The air conditioner 131 may include at least one discharge port 131a installed in the center fascia 130 and configured to discharge air. The center fascia 130 may be provided with a button or dial to control the air conditioner 131, and the like. The driver or passenger may control the air conditioner 131 by using the button disposed at the center fascia 130.

The clock 132 may be disposed near the button or dial to control the air conditioner 131.

The audio device 133 may include a control panel on which a plurality of buttons to perform functions of the audio device 133 are disposed. The audio device 133 may provide a radio mode to provide radio functions and a media mode to reproduce audio files of various storage media including the audio files.

The display 134 may output vehicle-related information as an image or texts. For example, when an event occurs while the vehicle 100 operates in accordance with an advanced driver assistance system (ADAS) control logic, the display 134 may output an image or texts corresponding to the event to inform the driver and passengers of occurrence of the event.

To this end, the display 134 may be embedded in the center fascia 130. However, installation of the display 134 is not limited thereto, and the display 134 may be detachably mounted on the center fascia 130 of the vehicle 100.

In this regard, the display 134 may be implemented using a liquid crystal display (LCD), a light emitting diode (LED), a plasma display panel (PDP), an organic light emitting diode (OLED), or a cathode ray tube (CRT), without being limited thereto.

Also, the dashboard 150 may further include an instrument cluster to display a driving speed of the vehicle 100, a revolution per minute (RPM) of an engine RPM, a fuel level, or the like, and a glove compartment for miscellaneous storage.

The vehicle 100 may include the speaker 160 configured to output sound. The speaker 160 may output information related to the vehicle 100 as sound. For example, when an event occurs while the vehicle 100 operates in accordance with the ADAS control logic, the speaker 160 may output a sound corresponding to the event to inform the driver and passengers of occurrence of the event.

The vehicle 100 may be provided with an advanced driver assistance system (ADAS). As used herein, ADAS refers to a system providing information regarding a state of a vehicle, a driver's condition, and surrounding environment or actively controlling the vehicle to relieve driver's workload and enhance driving convenience.

The ADAS mounted on a vehicle may include blind spot detection (BSD) to alert the driver and passengers of the risk of an impending collision in a blind spot, a forward collision warning system (FWC) to warn the driver and passengers of an imminent crash with a vehicle ahead, an advanced emergency braking system (AEBS) to automatically activate a braking system by reducing the vehicle speed in accordance with the possibility of collision with a vehicle ahead, advanced smart cruise control (ASCC) to activate an autonomous driving mode by automatically increasing or reducing the vehicle speed in accordance with a vehicle ahead, a land departure waring system (LDWS) to warn the driver and passengers of lane departure of the vehicle, a lane keeping assist system (LKAS) to support the driver in staying within its land, and a rear-end collision warning system (RCW) to warn the driver and passengers of an impending collision with a vehicle behind, without being limited thereto.

The vehicle provided with the ADAS may operate in accordance with a predetermined ADAS control logic. As used herein, the ADAS control logic may refer to an algorithm predetermined as software or a logic circuit designed as hardware for normal operation of the ADAS.

One or more setting values may be applied to the predetermined ADAS control logic. Parameters may include a first setting value set by an input of the driver or passenger and a second setting value preset during a manufacturing process of the ADAS control logic.

As described above, the setting values are preset before the ADAS operates mounted on the vehicle. As a result, it is difficult to operate the ADAS in response to environment surrounding the vehicle which changes in real time.

According to an embodiment, a vehicle that changes a setting value of the ADAS control logic based on predetermined environment information and a method of controlling the vehicle are provided. Hereinafter, the vehicle will be described in detail.

Figure 3A:
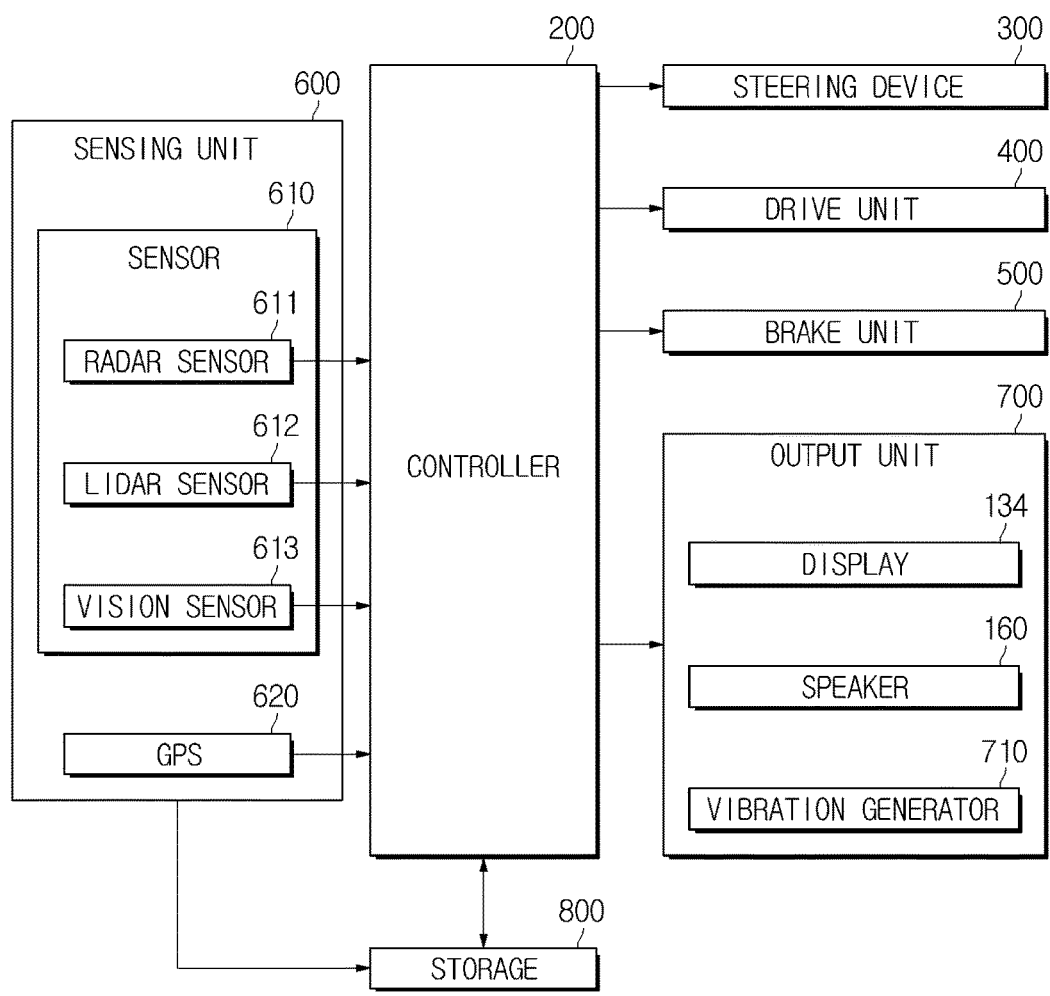
FIGS. 3A and 3B are control block diagrams of a vehicle according to embodiments of the present disclosure.
Figure 3B:
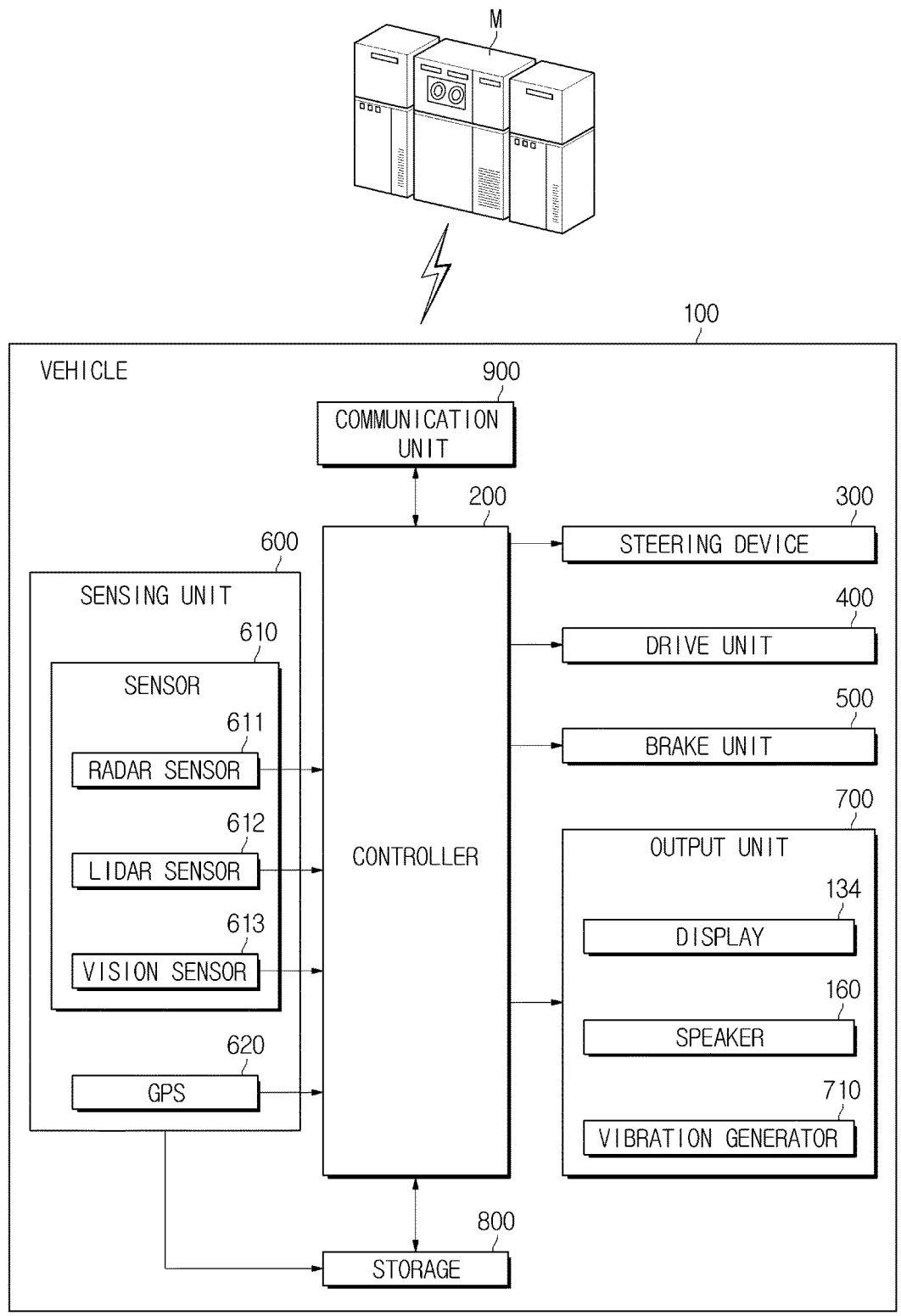

FIGS. 3A and 3B are control block diagrams of vehicles according to embodiments of the present disclosure.

Referring to FIG. 3A, a vehicle 100 according to an embodiment includes a sensing unit 600 configured to acquire environment information of a given area, a storage 800 configured to store the acquired environment information and a predetermined ADAS control logic, a controller 200 configured to change a setting value of the ADAS control logic in real time based on the acquired environment information and to control the vehicle 100 in accordance with the ADAS control logic operating using the changed setting value, a steering device 300 configured to change a driving direction under control of the controller 200, an drive unit 400 configured to accelerate the vehicle 100 under control of the controller 200, a brake unit 500 configured to brake the vehicle 100 under control of the controller 200, and an output unit 700 configured to inform the driver and passengers of driving-related information by visually, audibly, or tactilely outputting the information.

The steering device 300 is a device to control the vehicle 100 to move in a desired direction of steering in accordance with a driver's intention of steering. First, the steering device 300 may determine the driver's intention of steering based on a rotational direction of the steering wheel. Then, the steering device 300 may rotate the wheels in the direction of steering corresponding to the rotational direction of the steering wheel. In this case, the steering device 300 may rotate the wheels using oil pressure or power of a motor. When the wheels are rotated by the steering device 300, the vehicle 100 may proceed in the direction of steering in accordance with the driver's intention of steering.

The drive unit 400 is a device generating power to move the vehicle 100. To this end, the drive unit 400 may be implemented using an engine that generates a rotational force by combusting a fossil fuel or a motor that generates a rotational force upon receiving power from a capacitor. The rotational force generated by the drive unit 400 is transmitted to the wheels, and the wheels rotate by the rotational force, thereby moving the vehicle 100.

The brake unit 500 is a device to slow the 100 or stop the vehicle 100 while driving. Particularly, the brake unit 500 may acquire a braking force by an oil pressure of an electrical rotational force of a motor. The brake unit 500 may slow or stop the vehicle 100 by apply the acquired braking force to the wheels.

The output unit 700 may output information regarding the vehicle 100 such that the driver and passengers visually, audibly, or tactilely recognize the information. To this end, the output unit 700 may include a display 134 that visually outputs the information regarding the vehicle 100, a speaker 160 that audibly outputs the information regarding the vehicle 100, and a vibration generator 710 that tactilely outputs the information regarding the vehicle 100.

Since the display 134 and the speaker 160 are the same as those described above with reference to FIG. 2, detailed descriptions thereof will not be repeated.

The vibration generator 710 may output the information regarding the vehicle 100 in the form of vibrations. For example, when an event occurs while the vehicle 100 operates in accordance with the ADAS control logic, the vibration generator 710 may inform the driver and passengers of occurrence of the event by outputting a vibration pattern corresponding to the event.

To this end, the vibration generator 710 may be located at a position in direct contact with the driver or passengers. For example, the vibration generator 710 may be installed in the steering wheel to transmit vibrations to hands of the driver.

Alternatively, the vibration generator 710 may be installed in the seats where the driver and passenger sit. However, these are examples of installation positions of the vibration generator 710, and the position of the vibration generator 710 is not limited thereto.

The sensing unit 600 may acquire environment information of a given area in real time. As used herein, the environment information may include driving-related information of adjacent vehicles located in a given area (e.g., relative speeds, widths, or lane departures of the adjacent vehicles), and location information of the given area (e.g., a geographical location of the vehicle 100). In addition, the given area refers to a sensing area of the sensing unit 600, for example, an area adjacent to a location where the vehicle 100 drives.

The sensing unit 600 may be implemented using various devices to acquire environment information. According to an embodiment, the sensing unit 600 may include a sensor 610 to acquire driving-related information of adjacent vehicles located in the given area, and a global positioning system (GPS) 620 to acquire location information of the given area.

The sensor 610 may include a Radar sensor 611 that senses locations and relative speeds of adjacent vehicles, a Lidar sensor 612 that senses relative speeds of adjacent vehicles, distances from the adjacent vehicles, and widths of the adjacent vehicles, and a Vision sensor 613 that senses shapes of the adjacent vehicles, sizes of the adjacent vehicles, and lanes.

The GPS 620 may sense a geographical location of the vehicle 100 provided with the GPS, i.e., the driver's own vehicle. For example, the GPS 620 may acquire information regarding a road where the vehicle 100 mounted with the GPS 620 drives. To this end, the GPS 620 is able to communicate with a GPS satellite to receive locations of the GPS 620 and the vehicle 100 mounted with the GPS 620.

The storage 800 may store information regarding control of the vehicle 100 and provide the stored information in response to a request from the controller 200 later. Particularly, the storage 800 may store the environment information acquired by the sensing unit 600 or the ADAS control logic.

To this end, the storage 800 may be implemented using at least one type selected from the group consisting of a flash memory, a hard disk drive, a multimedia card micro memory, a card-type memory (e.g., secure digital (SD) card or an extreme digital (XD) card memory), a random access memory (RAM), a static random access memory (SRAM), a read only memory (ROM), an electrically erasable programmable read only memory (EEPROM), a programmable read only memory (PROM), a magnetic memory, a magnetic disc, and an optical disc.

The controller 200 may receive the environment information from the storage 800 or the sensing unit 600 and change setting values of the ADAS control logic based thereon. The controller 200 of the vehicle 100 according to an embodiment determines whether the environment information satisfies predetermined conditions and automatically changes a first setting value, which is set by an input of the driver or passenger, among the setting values of the ADAS control logic in accordance with the result of determination. In this regard, the environment information used to change the first setting value may include driving-related information of adjacent vehicles.

Here, the predetermined conditions are standards to determine necessity of changing the first setting value and may be set by an input of the driver or passenger or may be preset during a manufacturing process.

According to the embodiment illustrated in FIG. 3A, the controller 200 may determine the necessity of changing the first setting value without performing a communication with an external device and change the first setting value into a value corresponding to the result of determination.

Hereinafter, operation of the controller 200 will be described in more detail on the assumption that an ASCC is used as the ADAS.

While the vehicle 100 operates in accordance with an ASCC control logic, driver's comfort or driver's feeling of security about a distance from a vehicle ahead while driving may vary. Thus, the driver may directly set the distance from the vehicle ahead for operation of the ASCC. That is, the distance from the vehicle ahead is applied to the ASCC control logic and may be used as the first setting value set by the input of the driver or passenger.

When the sensing unit 600 acquires driving-related information of the vehicle ahead, the controller 200 may determine a driving pattern of the vehicle ahead upon receiving the driving-related information in real time. If rapid reduction in the speed of the vehicle ahead is repeatedly sensed from the received driving-related information, the controller 200 may determine that the vehicle ahead has a sudden braking driving pattern.

After determining the driving pattern of the vehicle ahead, the controller 200 may change the first setting value corresponding to a determined control pattern. Upon determination that the vehicle ahead has the sudden braking driving pattern, the controller 200 may increase the distance from the vehicle ahead as the first setting value.

After changing the first setting value, the controller 200 may apply the first setting value to the ADAS control logic. If the distance from the vehicle ahead is increased as the first setting value, the controller 200 may apply the increased distance to the ASCC control logic.

Finally, the controller 200 may control the vehicle 100 in accordance with the ADAS control logic. When the vehicle 100 is under control of the ADAS control logic to which the increased distance from the vehicle ahead is applied, the controller 200 may control the drive unit 400 and the brake unit 500 to increase the distance from the vehicle ahead.

FIG. 3A illustrates that the controller 200 changes the setting value of the ADAS control logic. Hereinafter, a case that the controller 200 receives an ADAS control logic using a setting value changed by a remote server M will be described with reference to FIG. 3B

Referring to FIG. 3B, a vehicle 100 according to another embodiment includes a sensing unit 600 configured to acquire environment information of a given area, a storage 800 configured to store the acquired environment information and a predetermined ADAS control logic, a controller 200 configured to request a remote sever M to change a setting value of the ADAS control logic in real time based on the acquired environment information, receive the ADAS control logic using the changed setting value from the remote server M, and control the vehicle 100 in accordance with the ADAS control logic, a communication unit 900 configured to communicate with the remote server M under control of the controller 200, a steering device 300 configured to change a driving direction under control of the controller 200, an drive unit 400 configured to accelerate the vehicle 100 under control of the controller 200, a brake unit 500 configured to brake the vehicle 100 under control of the controller 200, and an output unit 700 configured to inform the driver and passengers of driving-related information by visually, audibly, or tactilely outputting the information.

The vehicle 100 illustrated in FIG. 3B further includes the communication unit 900 in addition to the constituent elements illustrated in FIG. 3A. Thus, repeated descriptions of the same constituent elements as those of FIG. 3A will be omitted, and operation of the communication unit 900 and the controller 200 will be described in detail.

The communication unit 900 may use various communication methods to transmit/receive information to/from the remote server M. For example, the communication unit 900 may transmit/receive radio frequency (RF) signals to/from another device via a base station using communication methods such as $3^{rd}$ Generation (3G) and $4^{th}$ Generation (4G) methods. Besides, the communication unit 900 may transmit/receive information to/from the remote server M within a predetermined distance therefrom by using communication methods such as wireless local area network (LAN), Wi-Fi, Bluetooth, Zigbee, Wi-Fi Direct (WFD), Ultra wideband (UWB), Infrared Data Association (IrDA), Bluetooth Low Energy (BLE), and Near Field Communication (NFC).

In addition, the communication unit 900 may transmit/receive RF signals by using a $5^{th}$ Generation (5G) communication method. Hereinafter, the 5G communication method will be described in detail with reference to FIG. 4.

Figure 4:
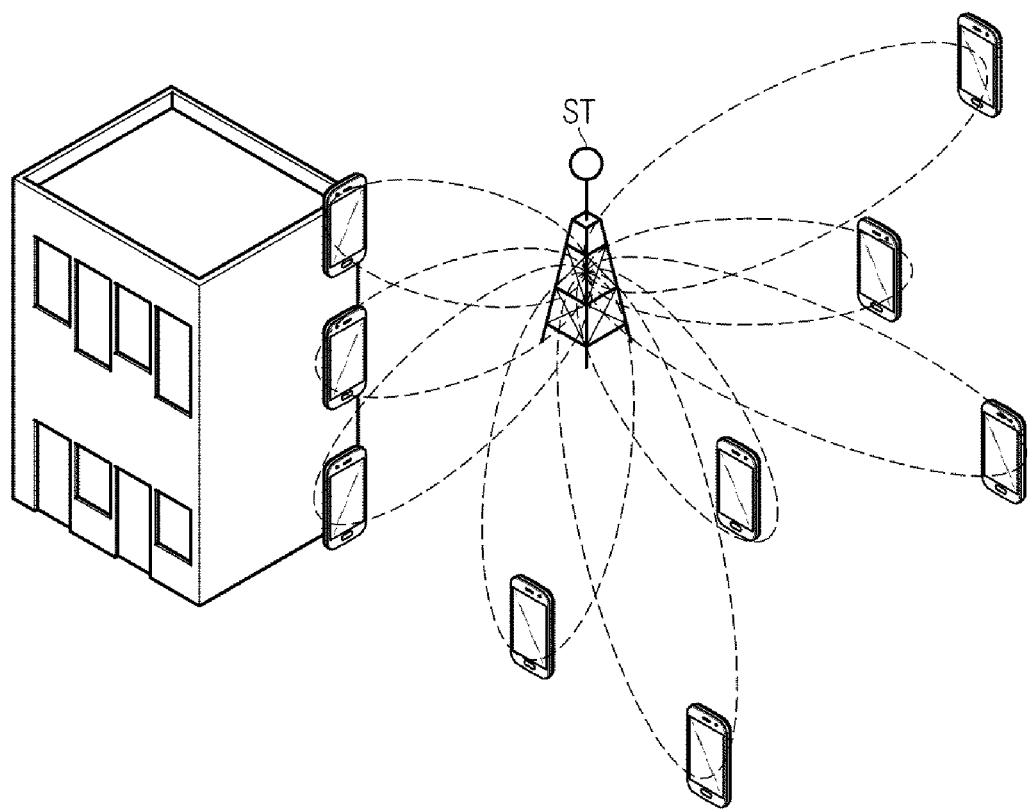
FIG. 4 is a diagram illustrating a large scale antenna system of a base station used in a 5G communication system according to an embodiment of the present disclosure.

FIG. 4 is a diagram illustrating a large scale antenna system of a base station used in a 5G communication system according to an embodiment.

Although a 4G communication system uses a frequency bandwidth of 2 GHz or less, a 5G communication system may use an ultra-high frequency bandwidth of about 28 GHz. However, frequency bandwidths used in the 5G communication system is not limited thereto.

The 5G communication system may include a large scale antenna system. The large scale antenna system refers to a system covering ultra-high frequency bandwidths by using dozens of antennas and simultaneously transmitting/receiving a large amount of information via multiple access. Particularly, the large scale antenna system may allow large capacity transmission and expand a range of the 5G communication network by transmitting/receiving electric waves farther in a predetermined direction by adjusting arrangement of antenna units.

Referring to FIG. 4, the base station may simultaneously transmit/receive information to/from a lot of devices via the large scale antenna system. Also, the large scale antenna system may reduce noise by minimizing electric waves transmitted in directions other than a desired direction leading to an improvement of transmission quality and a reduction in power consumption.

In addition, since the 5G communication system transmits RF signals modulated using a non-orthogonal multiplexing access (NOMA) method, different from an orthogonal frequency division multiplexing (OFDM) method conventionally used for modulation of transmit signals, multiple access to more devices and large capacity transmission and reception are possible.

For example, the 5G communication system may provide a maximum data rate of 1 Gbps. The 5G communication system may provide large capacity transmission by supporting immersive communication that requires large capacity transmission, such as Ultra-HD (UHD), 3D images, and holograms. Thus, a user may transmit/receive ultra-high capacity data to obtain elaborate and immersive effects via the 5G communication system.

In addition, the 5G communication system may perform real time data processing with a maximum response time of 1 ms or less. Accordingly, the 5G communication system may support a real time service in which a response is faster than human recognition. For example, the vehicle 100 may provide not only an autonomous driving system but also various remote control systems via real time data processing by receiving sensor information from various devices while driving. In addition, the vehicle 100 may provide possibility of collision to the user in real time by processing sensor information of adjacent vehicles in real time via the 5G communication system and provide information regarding expected traffic situations on the roads in real time.

The vehicle 100 may also provide the driver and passengers with a Big Data service by real time data processing with microsecond precise latency and large capacity transmission provided by the 5G communication system. For example, the vehicle 100 may provide customized information suitable for a situation of the driver and passengers in the vehicle 100 by analyzing web information and SNS information. According to an embodiment, the vehicle 100 may collect information regarding surroundings of the vehicle 100 such as restaurants and tourist attractions by big data mining and provide the information in real time, such that the driver and passengers immediately identify the information regarding surroundings of the vehicle 100 while driving.

When the communication unit 900 uses the 5G communication system as described above, the vehicle 100 may transmit/receive a large amount of information to/from the remote server M at a high rate. As a result, the vehicle 100 may exchange information with the remote server M in real time regardless of the amount of information.

The controller 200 may receive environment information from the storage 800 or the sensing unit 600 and change a setting value of the ADAS control logic based on the received environment information. Particularly, according to the embodiment illustrated in FIG. 3B, the controller 200 may determine whether the environment information satisfies predetermined conditions and may receive, from the remote server M upon the result of the determination, an ADAS control logic to which a second setting value preset during a manufacturing process of the ADAS control logic is applied. In this regard, the environment information used to change the second setting value may include location information of the given area.

Here, the predetermined conditions are standards to determine whether the second setting value needs to be changed and may be determined by an input of the driver or passenger or preset during the manufacturing process.

Hereinafter, operation of the controller 200 will be described in more detail on the assumption that BSD is used as the ADAS.

While the vehicle 100 operates in accordance with a BSD control logic, the driver and passengers may recognize that a warning time is faster or slower than that expected depending on types of the road where the vehicle 100 drives. For example, while the vehicle 100 drives on a highway, the driver and passengers may recognize that a preset warning time is slower than that expected. On the contrary, while the vehicle 100 drives on an irregular road on which the vehicle 100 cannot drive at a high speed, such as an unpaved road, the driver and passengers may recognize that the preset warning time is faster than that expected. Thus, the BSD control logic needs to change at least one preset second setting value that determines the warning time according to the types of roads.

To this end, when the sensing unit 600 acquires location information of the vehicle 100 in which the driver and passengers are riding, the controller 200 may receive the location information therefrom in real time and control the communication unit 900 to transmit the location information to the remote server M.

Then, the serve M may identify a road corresponding to the location information received from the vehicle 100 and determine a driving pattern of the vehicle 100 driving on the road. To this end, the serve M may collect speed of the vehicle 100 driving on the road. In addition, the remote server M may change the second setting value corresponding to the determined driving pattern.

If the location information received from the vehicle 100 is a highway, the remote server M may determine that the vehicle 100 driving on the road has a high-speed driving pattern. Then, the remote server M may change the second setting value related to the warning time to advance the warning time of the BSD.

The controller 200 may receive the ADAS control logic to which the second setting value changed by the remote server M is applied via the communication unit 900. According to the aforementioned example, the controller 200 may receive the BSD control logic in which the warning time is advanced from the remote server M.

Finally, the controller 200 may control the vehicle 100 in accordance with the ADAS control logic to which the changed second setting value is applied. If the vehicle 100 operates in accordance with the BSD control logic in which the warning time is advanced, the controller 200 may control the output unit 700 to advance the warning time of informing the risk of collision with an adjacent vehicle located in the blind spot. For example, the controller 200 may advance a time at which the display 134 outputs a warning screen, a time at which the speaker 160 outputs a warning sound, and a time at which the vibration generator 710 outputs a warning vibration pattern.

According to another embodiment, operation of the controller 200 will be described on the assumption that LKAS is used as the ADAS.

While the vehicle 100 operates in accordance with an LKAS control logic, the driver and passengers may recognize that a warning time or steering control time is faster or slower than that expected depending on driving patterns of adjacent vehicles driving on both sides of the vehicle 100. For example, if an adjacent vehicle driving on the right lane of the vehicle 100 has a driving pattern of invading the left lane of the adjacent vehicle, the driver and passengers may recognize that a preset warning time or steering control time is slower than that expected. On the contrary, if the adjacent vehicle driving on the right lane of the vehicle 100 has a driving pattern of invading the right lane of the adjacent vehicle, the driver and passengers may recognize that the predetermined waring time or steering control time is faster than that expected. Thus, the LKAS control logic needs to change at least one preset second setting value that determines the warning time or steering control time depending on the driving pattern of the adjacent vehicle.

To this end, when the sensing unit 600 acquires driving-related information of an adjacent vehicle of one side lane, the controller 200 may receive the driving-related information in real time therefrom and control the communication unit 900 to transmit the driving-related information to the serve M.

The serve M may determine the driving pattern of the adjacent vehicle driving on the side lane corresponding to the driving-related information received from the vehicle 100. If lane invasion of the adjacent vehicle is repeatedly sensed from the driving-related information received from the vehicle 100, the remote server M may determine that the adjacent vehicle has a lane invasion driving pattern.

Then, the serve M may change the second setting value related to the warning time or steering control time to advance the warning time or steering control time of the LKAS. In this regard, one or more second setting values related to the warning time or steering control time of the LKAS may be used.

The controller 200 may receive the LKSA control logic to which the second setting value changed by the remote server M is applied via the communication unit 900. As a result, the controller 200 may control the vehicle 100 in accordance with the LKAS control logic to which the changed second setting value is applied.

If the vehicle 100 operates in accordance with the LKAS control logic in which the waring time is advanced, the controller 200 may control the output unit 700 to advance the warning time of lane invasion. For example, the controller 200 may advance a time at which the display 134 outputs a warning screen, a time at which the speaker 160 outputs a warning sound, and a time at which the vibration generator 710 outputs a warning vibration pattern.

In addition, when the vehicle 100 operates in accordance with the LKAS control logic in which the steering control time is advanced, the controller 200 may control the steering device 300 to automatically change the direction of steering when lane departure of the adjacent vehicle is sensed.

Although the case in which the controller 200 receives the ADAS control logic using the changed second setting value from the external remote server M is described above with reference to FIG. 3B, the controller 200 may also change the second setting value.

When the sensing unit 600 acquires location information of the given area, the controller 200 may determine the driving pattern of the vehicle 100 driving in the given area based on the acquired location information. Then, the controller 200 may change the second setting value corresponding to the driving pattern of the vehicle 100 driving in the given area.

In addition, although the case in which the controller 200 changes the first setting value is described above with reference to FIG. 3A, according to another embodiment, the controller 200 may also receive the ADAS control logic using a changed first setting value from the external serve M.

When the sensing unit 600 acquires driving-related information of an adjacent vehicle located in the given area, the controller 200 may transmit the driving-related information of the adjacent vehicle or the driving pattern of the adjacent vehicle determined based on the driving-related information to the remote server M. Then, the controller 200 may receive the ADAS control logic in which the first setting value is changed from the remote server M.

Figure 5:
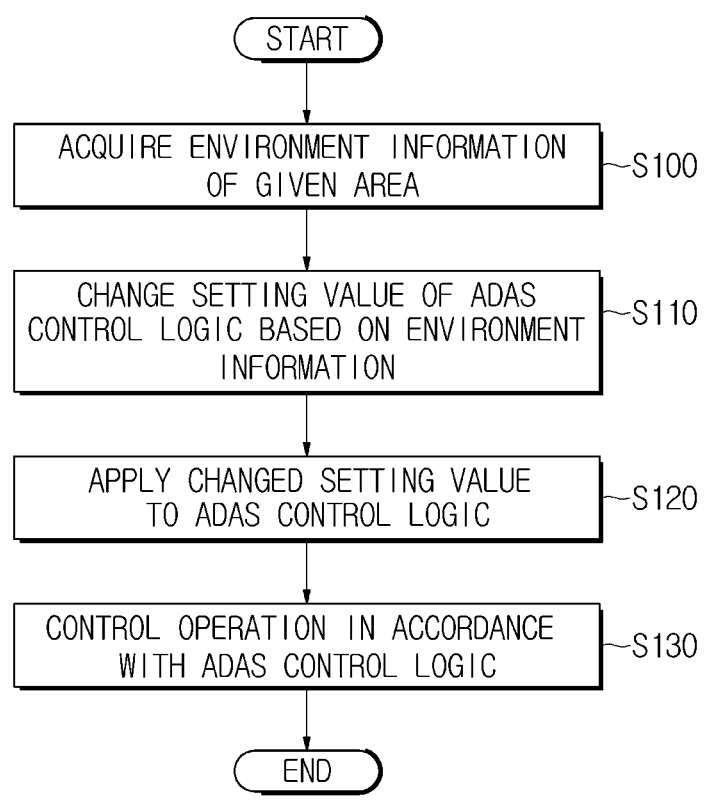
FIG. 5 is a flowchart illustrating a method of controlling a vehicle according to an embodiment of the present disclosure.

FIG. 5 is a flowchart illustrating a method of controlling a vehicle according to an embodiment of the present disclosure.

First, the vehicle may acquire environment information of a given area by controlling the sensing unit (S100). In this regard, the given area may refer to an area around the sensing unit 600 sensed by the sensing unit 600. In addition, the environment information may include driving-related information of an adjacent vehicle located in the given area (e.g., relative speed, width, or lane departure of the adjacent vehicle) and location information of the given area (e.g., geographical location of the vehicle).

The sensing unit 600 may include: a sensor 610, which includes a Radar sensor 611 that senses locations and relative speeds of adjacent vehicles, a Lidar sensor 612 that senses relative speeds of adjacent vehicles, distances from the adjacent vehicles, and widths of the adjacent vehicles, and a Vision sensor 613 that senses shapes of the adjacent vehicles, sizes of the adjacent vehicles, and lanes; and a GPS 620 to sense location information of the given area.

Then, the vehicle may change a setting value of the ADAS control logic based on the acquired environment information (S110).

In this regard, the ADAS control logic may be a software algorithm or a hardware logic circuit to drive the ADAS such as BSD to alert the driver and passengers of the risk of an impending collision in a blind spot, a FWC to warn the driver and passengers of an imminent crash with a vehicle ahead, an AEBS to automatically activate a braking system by reducing the vehicle speed in accordance with the possibility of collision with a vehicle ahead, an ASCC to activate an autonomous driving mode by increasing or reducing the vehicle speed in accordance with a vehicle ahead, an LDWS to warn the driver and passengers of lane departure of the vehicle, an LKAS to support the driver in staying within its land, an RCW to warn the driver and passengers of an impending collision with a vehicle behind.

In addition, at least one setting value may be applied to the ADAS control logic. The setting value may include a first setting value set by an input of the driver or passenger and a second setting value preset during a manufacturing process of the ADAS control logic.

The vehicle 100 may appropriately change the setting value corresponding to the acquired environment information, and this will be described in more detail later.

After changing the setting value, the vehicle may apply the changed setting value to the ADAS control logic (S120). Finally, the vehicle may operate in accordance with the ADAS control logic (S130). Since the setting value changed according to the environment information is applied to the ADAS control logic of the vehicle 100, the vehicle 100 may perform an ADAS operation adaptive to driving environment of the vehicle 100.

Hereinafter, a method of changing the setting value based on the environment information will be described in detail.

Figure 6:
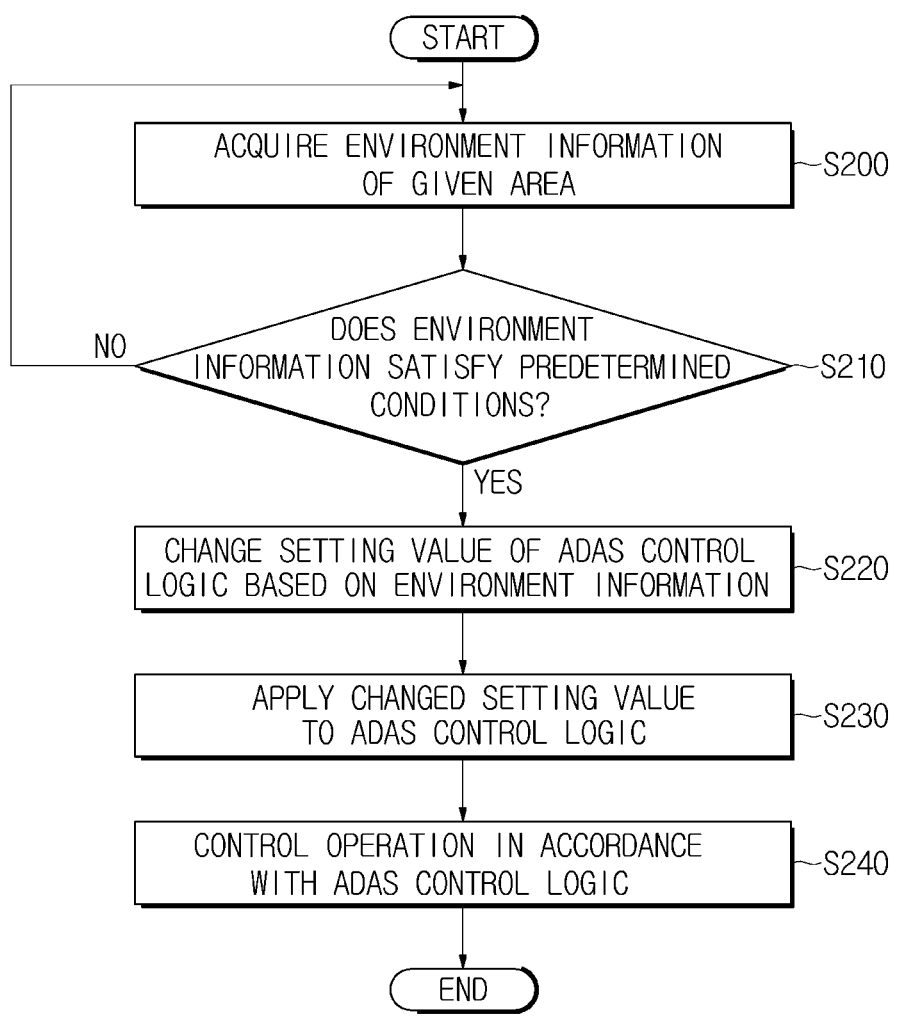
FIG. 6 is a flowchart illustrating a method of controlling a vehicle according to another embodiment of the present disclosure.

FIG. 6 is a flowchart illustrating a method of controlling a vehicle according to another embodiment of the present disclosure.

First, the vehicle may acquire environment information of a given area from the sensing unit (S200). In this regard, the environment information may include driving-related information of adjacent vehicles located in the given area (e.g., relative speeds, widths, or lane departures of the adjacent vehicles), and location information of the given area (e.g., a geographical location of the vehicle).

After the environment information is acquired, the vehicle 100 determines whether the environment information satisfies predetermined conditions (S210). In this regard, the predetermined conditions are standards to determine whether the setting value needs to be changed and may be determined by an input of the driver or passenger or preset during the manufacturing process.

If the environment information does not satisfy the predetermined conditions, the vehicle may repeatedly acquire environment information of the given area.

On the contrary, when the environment information satisfies the predetermined conditions, the vehicle may change the setting value of the ADAS control logic based on the environment information (S220). For example, if the environment information is the number of sudden braking of an adjacent vehicle and the number of sudden braking of the adjacent vehicle satisfies predetermined conditions, a distance from a vehicle ahead of the ASCC may be increased in the ADAS control logic.

After changing the setting value, the vehicle may apply the changed setting value to the ADAS control logic (S230). Finally, the vehicle may operate in accordance with the ADAS control logic (S240). If the increased distance from the vehicle ahead is applied to the ADAS control logic according to the number of sudden braking of the vehicle ahead, the vehicle 100 may control the operation of the drive unit 400 and the brake unit 500 to increase the distance from the vehicle ahead.

Figure 7:
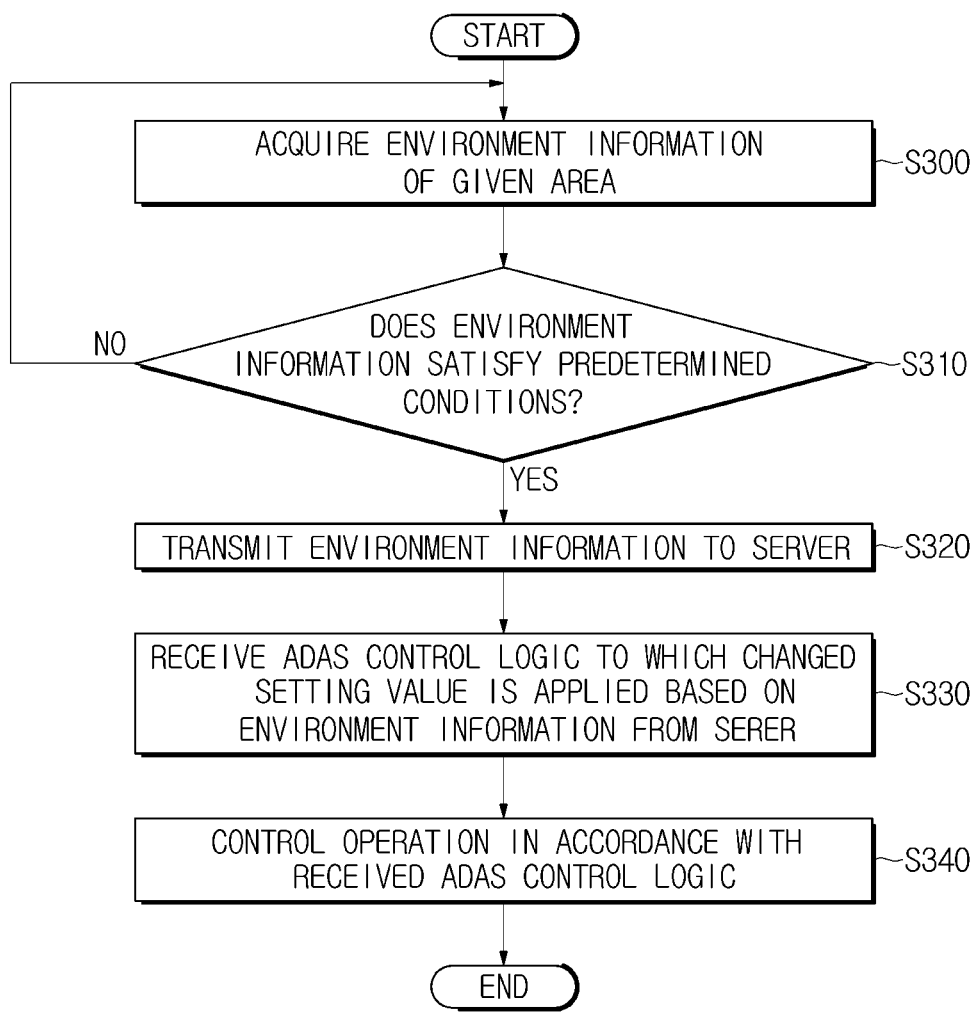
FIG. 7 is a flowchart illustrating a method of controlling a vehicle according to another embodiment of the present disclosure.

FIG. 7 is a flowchart illustrating a method of controlling a vehicle according to another embodiment of the present disclosure.

First, the vehicle may acquire environment information of a given area by controlling the sensing unit (S300). In this regard, the environment information may include driving-related information of adjacent vehicles located in the given area (e.g., relative speeds, widths, or lane departures of the adjacent vehicles), and location information of the given area (e.g., a geographical location of the vehicle).

After the environment information is acquired, the vehicle 100 determines whether the environment information satisfies predetermined conditions (S310). In this regard, the predetermined conditions are standards to determine whether the setting value needs to be changed and may be set by an input of the driver or passenger or preset during the manufacturing process.

If the environment information does not satisfy the predetermined conditions, the vehicle 100 may repeatedly acquire environment information of the given area.

On the contrary, when the environment information satisfies the predetermined conditions, the vehicle may transmit the acquired environment information to the remote server M (S320). For example, if the environment information is a road where the vehicle drives and the road satisfies the predetermined conditions, the vehicle 100 may transmit information regarding the road where the vehicle 100 drives to the remote server M.

The serve M may change the setting value of the ADAS control logic based on the environment information received from the vehicle 100. For example, upon receiving the information regarding the road where the vehicle 100 drives, the serve M may change the setting value of the BSD control logic to have a warning time corresponding to an average speed of the vehicle driving on the road. Also, the remote server M may apply the changed setting value to the BSD control logic.

Then, the vehicle may receive the ADAS control logic to which the setting value changed based on the environment information is applied from the remote server M (S330). According to the aforementioned example, after transmitting the information regarding the road where the vehicle 100 drives to the remote server M, the vehicle 100 may receive the BSD control logic in which the setting value is changed in accordance with the corresponding road from the remote server M.

Finally, the vehicle 100 may operate in accordance with the ADAS control logic (S340). Upon receiving the BSD control logic in which the setting value is changed to advance the warning time, the vehicle 100 may inform the driver and passengers of the risk of an accident in advance by controlling the output unit 700.

Hereinafter, a method of changing the setting value according to types of the acquired environment information will be described in more detail.

Figure 8:
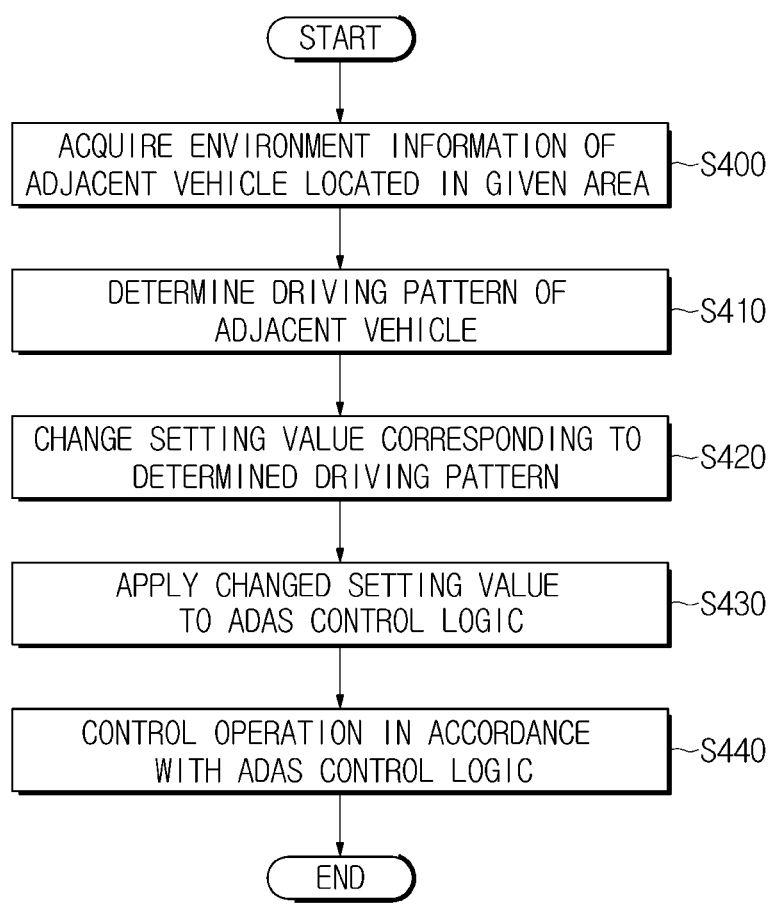
FIG. 8 is a flowchart illustrating a method of controlling a vehicle according to another embodiment of the present disclosure.

FIG. 8 is a flowchart illustrating a method of controlling a vehicle according to another embodiment of the present disclosure.

First, the vehicle 100 may acquire driving-related information of an adjacent vehicle located in a given area by controlling the sensing unit (S400). In this regard, the driving-related information of the adjacent vehicle may include a relative speed, width, or lane departure of the adjacent vehicle.

After acquiring the driving-related information of the adjacent vehicle, the vehicle 100 may determine a driving pattern of the adjacent vehicle based on the acquired driving-related information of the adjacent vehicle (S410). For example, if the number of sudden braking of the adjacent vehicle is greater than a predetermined number of times in a given time interval or in a given driving distance, the vehicle 100 may determine that the adjacent vehicle has a sudden braking driving pattern.

Then, the vehicle 100 may change the setting value corresponding to the determined driving pattern (S420). Upon determination that the adjacent vehicle has the sudden braking driving pattern as described above, the vehicle 100 may increase a distance from a vehicle ahead in the ASCC control logic.

After changing the setting value, the vehicle 100 may apply the changed setting value to the ADAS control logic (S430) and control operation thereof in accordance with the ADAS control logic (S440). According to the aforementioned example, the vehicle 100 may control the drive unit 400 and the brake unit 500 in accordance with the ASCC in which the distance from the vehicle ahead is increased.

FIG. 9 is a flowchart illustrating a method of controlling a vehicle according to another embodiment.

First, the vehicle may acquire location information of a given area by controlling a sensing unit (S500). In this regard, the location information of the given area may be information of a location of the vehicle provided with the sensing unit 600 that acquires location information, i.e., the vehicle 100 in which the driver and passengers are riding (driver's own vehicle).

After acquiring the location information of the driver's own vehicle, the vehicle may determine a driving pattern of a vehicle driving in the given area based on the acquired location information (S510). For example, when an average speed of a vehicle driving on a road located in the given area where the driver's own vehicle drives is greater than a predetermined speed, it may be determined that the vehicle driving on the road has a high-speed driving pattern.

Then, the vehicle may change a setting value corresponding to the determined driving pattern (S520). Upon determination that the vehicle driving on the road has the high-speed driving pattern, the vehicle 100 may change a setting value related to a waring time in the BSD control logic.

After changing the setting value, the vehicle may apply the changed setting value to the ADAS control logic (S530) and control operation thereof in accordance with the ADAS control logic (S540). According to the aforementioned example, the vehicle 100 may control the output unit 700 in accordance with the BSD control logic in which the setting value related to the warning time is changed.

As is apparent from the above description, according to the vehicle and the method of controlling the same according to embodiments of the present disclosure, the vehicle may actively respond to environment surrounding the vehicle by changing setting values in real time.

Particularly, the vehicle may provide optimized ADAS functions by sensing environment of the vehicle in real time and changing setting values corresponding thereto.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle operating in accordance with a predetermined advanced driver assistance system (ADAS) control logic comprising:
    a sensing unit configured to acquire environment information of a given area; and
    a controller configured to change a setting value of the ADAS control logic based on the acquired environment information in real time when the environment information satisfies predetermined conditions and control the vehicle in accordance with the ADAS control logic based on the changed setting value,
    wherein the given area is an area adjacent to a location where the vehicle drives, and
    wherein the environment information includes at least one of driving-related information of an adjacent vehicle located in the given area and location information of the given area.

2. The vehicle according to claim 1, wherein the controller, based on the environment information, changes a first setting value preset by a user or a second setting value preset during a manufacturing process of the vehicle.

3. The vehicle according to claim 2, wherein the controller changes the first setting value based on the environment information when the environment information satisfies the predetermined conditions.

4. The vehicle according to claim 2, further comprising a communication unit,
    wherein the controller transmits the environment information to a server via the communication unit when the environment information satisfies the predetermined conditions and receives the ADAS control logic, to which the second setting value changed based on the environment information is applied, from the server via the communication unit.

5. The vehicle according to claim 1, wherein when the sensing unit acquires the driving-related information of the adjacent vehicle, the controller determines a driving pattern of the adjacent vehicle based on the driving-related information and changes the setting value corresponding to the determined driving pattern.

6. The vehicle according to claim 1, wherein when the sensing unit acquires the location information, the controller determines a driving pattern of the vehicle driving in the given area based on the location information and changes the setting value corresponding to the determined driving pattern.

7. The vehicle according to claim 1, wherein the controller controls the vehicle in accordance with the ADAS control logic comprising at least one selected from the group consisting of Blind Spot Detection (BSD), Forward Collision Warning System (FWC), Advanced Emergency Braking System (AEBS), Advanced Smart Cruise Control (ASCC), Lane Departure Warning System (LDWS), Lane Keeping Assist System (LKAS), and Rear-end Collision Warning System (RCW).

8. The vehicle according to claim 7, wherein the controller determines whether a vehicle ahead of the vehicle has a sudden braking pattern based on environment information acquired by the sensing unit and changes the setting value corresponding to a distance from the vehicle ahead in an ASCC control logic based on the determined result.

9. The vehicle according to claim 7, wherein the controller identifies a road on which the vehicle drives based on environment information acquired by the sensing unit and changes the setting value corresponding to a warning time of a BSD control logic based on the identified result.

10. A method of controlling a vehicle, the method comprising:
    acquiring environment information of a given area;
    changing a setting value of an advanced driver assistance system (ADAS) control logic of a vehicle based on the acquired environment information in real time when the environment information satisfies predetermined conditions; and
    operating in accordance with the ADAS control logic based on the changed setting value,
    wherein the given area is an area adjacent to a location where the vehicle drives, and
    wherein the environment information includes at least one of driving-related information of an adjacent vehicle located in the given area and location information of the given area.

11. The method according to claim 10, wherein the changing of the setting value of the ADAS control logic comprises changing, based on the environment information, a first setting value preset passenger user or a second setting value preset during a manufacturing process of the vehicle.

12. The method according to claim 11, wherein the changing of the setting value of the ADAS control logic comprises changing the first setting value based on the environment information when the environment information satisfies the predetermined conditions.

13. The method according to claim 11, wherein the changing of the setting value of the ADAS control logic comprises:
    transmitting the environment information to a server when the environment information satisfies the predetermined conditions; and
    receiving the ADAS control logic, to which the second setting value changed based on the environment information is applied, from the server.

14. The method according to claim 10, wherein the changing of the setting value of the ADAS control logic comprises:
    determining a driving pattern of the adjacent vehicle based on the driving-related information when the driving-related information of the adjacent vehicle is acquired; and
    changing the setting value corresponding to the determined driving pattern.

15. The method according to claim 10, wherein the changing of the setting value of the ADAS control logic comprises:
    determining a driving pattern of the vehicle driving in the given area based on the location information when the location information is acquired; and
    changing the setting value corresponding to the determined driving pattern.

16. The method according to claim 10, wherein the operating in accordance with the ADAS control logic is performed by operating in accordance with the ADAS control logic comprising at least one selected from the group consisting of Blind Spot Detection (BSD), Forward Collision Warning System (FWC), Advanced Emergency Braking System (AEBS), Advanced Smart Cruise Control (ASCC), Lane Departure Warning System (LDWS), Lane Keeping Assist System (LKAS), and Rear-end Collision Warning System (RCW).

17. The method according to claim 16, wherein the changing of the setting value of the ADAS control logic comprises:
    determining whether a vehicle ahead has a sudden braking driving pattern based on the acquired environment information; and
    changing a setting value corresponding to a distance from the vehicle ahead in an ASCC control logic based on the determined result.

18. The method according to claim 16, wherein the changing of the setting value of the ADAS control logic comprises:
    identifying a road on which the vehicle drives based on the acquired environment information; and
    changing a setting value corresponding to a warning time of a BSD control logic based on the identified result.

* * * * *